US006467469B2

(12) United States Patent
Yang et al.

(10) Patent No.: US 6,467,469 B2
(45) Date of Patent: Oct. 22, 2002

(54) EGR VALVE POSITION CONTROL SYSTEM

(75) Inventors: Chang Yang, West Bloomfield, MI (US); Gregory R. White, Columbus, IN (US); Robert S. Henrich, Columbus, IN (US); Yue Yun Wang, Columbus, IN (US); John M. Janssen, Nashville, IN (US); Ray C. Hatton, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 61 days.

(21) Appl. No.: 09/773,040

(22) Filed: Jan. 31, 2001

(65) Prior Publication Data

US 2002/0100462 A1 Aug. 1, 2002

(51) Int. Cl.$^7$ .............................................. F02M 25/07
(52) U.S. Cl. ............................. 123/568.21; 123/568.16
(58) Field of Search ....................... 123/568.16, 568.21; 701/108

(56) References Cited

U.S. PATENT DOCUMENTS

| | | | |
|---|---|---|---|
| 4,173,205 A | * 11/1979 | Toelle ................... 123/568.22 |
| 4,190,029 A | 2/1980 | Taplin |
| 4,333,440 A | 6/1982 | Eheim |
| 4,528,968 A | 7/1985 | Otobe |
| 4,662,604 A | 5/1987 | Cook |
| 4,823,749 A | 4/1989 | Eisenmann et al. |
| 5,094,218 A | 3/1992 | Everingham et al. |
| 5,201,303 A | 4/1993 | Kojima |
| 5,503,131 A | 4/1996 | Ohuchi |
| 5,791,319 A | 8/1998 | Friedrich et al. |
| 5,894,209 A | 4/1999 | Takagi et al. |
| 5,927,257 A | 7/1999 | Hackett |
| 6,000,385 A | * 12/1999 | Fukuma ................. 123/568.16 |
| 6,009,709 A | 1/2000 | Bailey |
| 6,019,094 A | 2/2000 | Itoyama |
| 6,035,835 A | 3/2000 | Shigihama et al. |
| 6,039,025 A | 3/2000 | Iwano et al. |
| 6,076,353 A | 6/2000 | Freudenberg et al. |
| 6,109,249 A | 8/2000 | Wild et al. |
| 6,112,729 A | 9/2000 | Barnes et al. |
| 6,148,616 A | * 11/2000 | Yoshida et al. ............ 60/605.2 |
| 6,164,270 A | * 12/2000 | Bidner et al. .......... 123/568.16 |

FOREIGN PATENT DOCUMENTS

| EP | 0 481 486 A2 | 4/1992 |
|---|---|---|
| EP | 0 764 780 A2 | 3/1997 |

* cited by examiner

Primary Examiner—Paul J. Hirsch
(74) Attorney, Agent, or Firm—Barnes & Thornburgh

(57) ABSTRACT

An EGR valve position control system includes an EGR valve manager responsive to an EGR valve command to drive an EGR valve actuator. The EGR valve manager is operable to schedule control gains as a function of valve actuation direction to provide for faster response during valve closing events. Valve closing events are also staged such that a large valve position step is followed by a steady ramp to the valve closed position to thereby prevent damage to the valve and/or valve seat. The EGR valve manager further includes a prioritized switching feature for strategically switching between closed and open loop control modes, and a forward gain adjustment feature responsive to battery voltage to maintain constant system DC gain under changing battery voltage conditions.

20 Claims, 9 Drawing Sheets

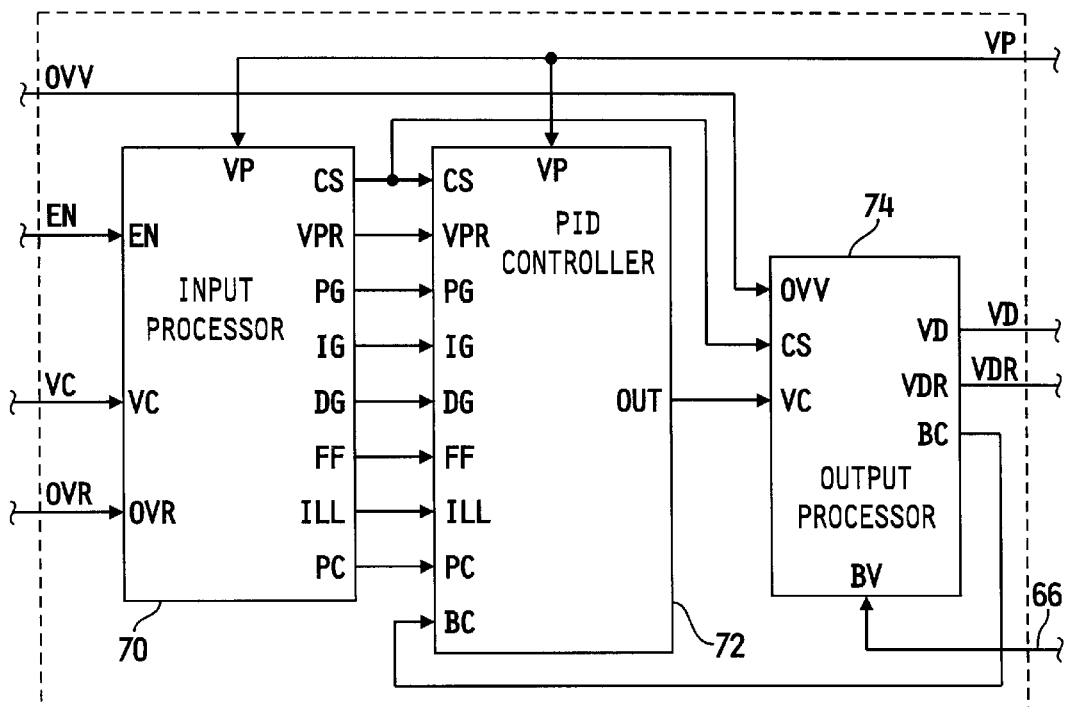
FIG. 2
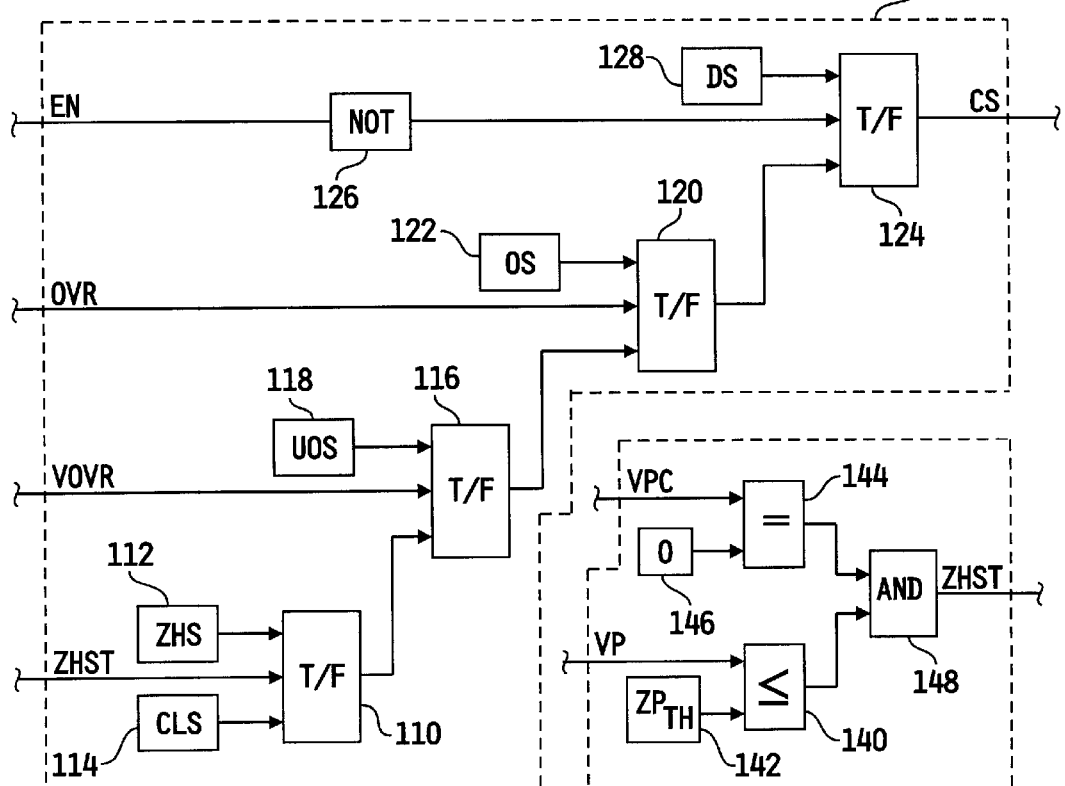
FIG. 4
FIG. 5

US 6,467,469 B2

EGR VALVE POSITION CONTROL SYSTEM

FIELD OF THE INVENTION

The present invention relates generally to systems for controlling actuation of a variable position valve, and more specifically to systems for maintaining accurate control over opening and closing events of an EGR valve for an internal combustion engine.

BACKGROUND OF THE INVENTION

When combustion occurs in an environment with excess oxygen, peak combustion temperatures increase which leads to the formation of unwanted emissions, such as oxides of nitrogen ($NO_x$). One known technique for reducing unwanted emissions such as $NO_x$ involves introducing chemically inert gases into the fresh air flow stream for subsequent combustion. By thusly reducing the oxygen concentration of the resulting charge to be combusted, the fuel burns slower and peak combustion temperatures are accordingly reduced, thereby lowering the production of $NO_x$.

In an internal combustion engine environment, such chemically inert gases are readily abundant in the form of exhaust gases, and one known method for achieving the foregoing result is through the use of a so-called Exhaust Gas Recirculation (EGR) system operable to controllably introduce (i.e., recirculate) exhaust gas from the exhaust manifold into the fresh air stream flowing to the intake manifold.

EGR operation is typically not required under all engine operating conditions, and known EGR systems accordingly include a valve, commonly referred to as an EGR valve, for controllably introducing exhaust gas to the intake manifold. Through the use of an on-board microprocessor, control of the EGR valve is typically accomplished as a function of information supplied by a number of engine operational sensors.

EGR valves must typically be robust enough to maintain a commanded position despite disturbances caused by pressure variations across the valve, yet at the same time be sensitive enough to provide for quick valve opening and valve closing response times. Because valve closing events are typically required to occur very quickly, many overly aggressive EGR valve control arrangements suffer from the drawback that damage to the valve may occur during seating. What is therefore needed is an EGR valve control system directed to overcoming this and other drawbacks associated with prior art EGR valve control systems.

SUMMARY OF THE INVENTION

The foregoing shortcomings of the prior art are addressed by the present invention. In accordance with one aspect of the present invention, a method of controlling operation of an EGR valve comprises the steps of monitoring an EGR valve command provided to control position of an EGR valve, stepwise forcing the EGR valve toward a closed position if said EGR valve command corresponds to a valve close command, monitoring EGR valve position, and ramping the EGR valve to said closed position when said EGR valve position is within a threshold distance from said closed position.

One object of the present invention is to provide an improved EGR valve control system operable to close the valve in a rapid stepwise fashion to a position short of a valve closed position, and to then more slowly ramp the valve to the closed position to thereby prevent damage to the valve and/or valve seat.

Another object of the present invention is to provide an EGR valve control system configured to schedule higher control gains during valve closing events than during valve non-closing events.

A further object of the present invention is to provide a PID controller-based EGR valve control system incorporating an integrator anti-windup feature operable to stop integration when integration limits are exceeded or when further integration worsens the extent of saturation.

Yet a further object of the present invention is to provide an EGR valve control system incorporating a battery compensation feature operable to maintain the DC gain of the system constant regardless of battery voltage level.

These and other objects of the present invention will become more apparent from the following description of the preferred embodiment.

BRIEF DESCRIPTION OF THE DRAWINGS

FIG. 2 is a diagrammatic illustration of one preferred embodiment of the EGR valve manager block of FIG. 1, in accordance with the present invention.

FIG. 4 is a diagrammatic illustration of one preferred embodiment of the control state logic block forming part of the input processor block of FIG. 3, in accordance with the present invention.

FIG. 5 is a diagrammatic illustration of one preferred embodiment of the zero position hold block forming part of the input processor block of FIG. 3, in accordance with the present invention.

DESCRIPTION OF THE PREFERRED EMBODIMENT

Figure 1:
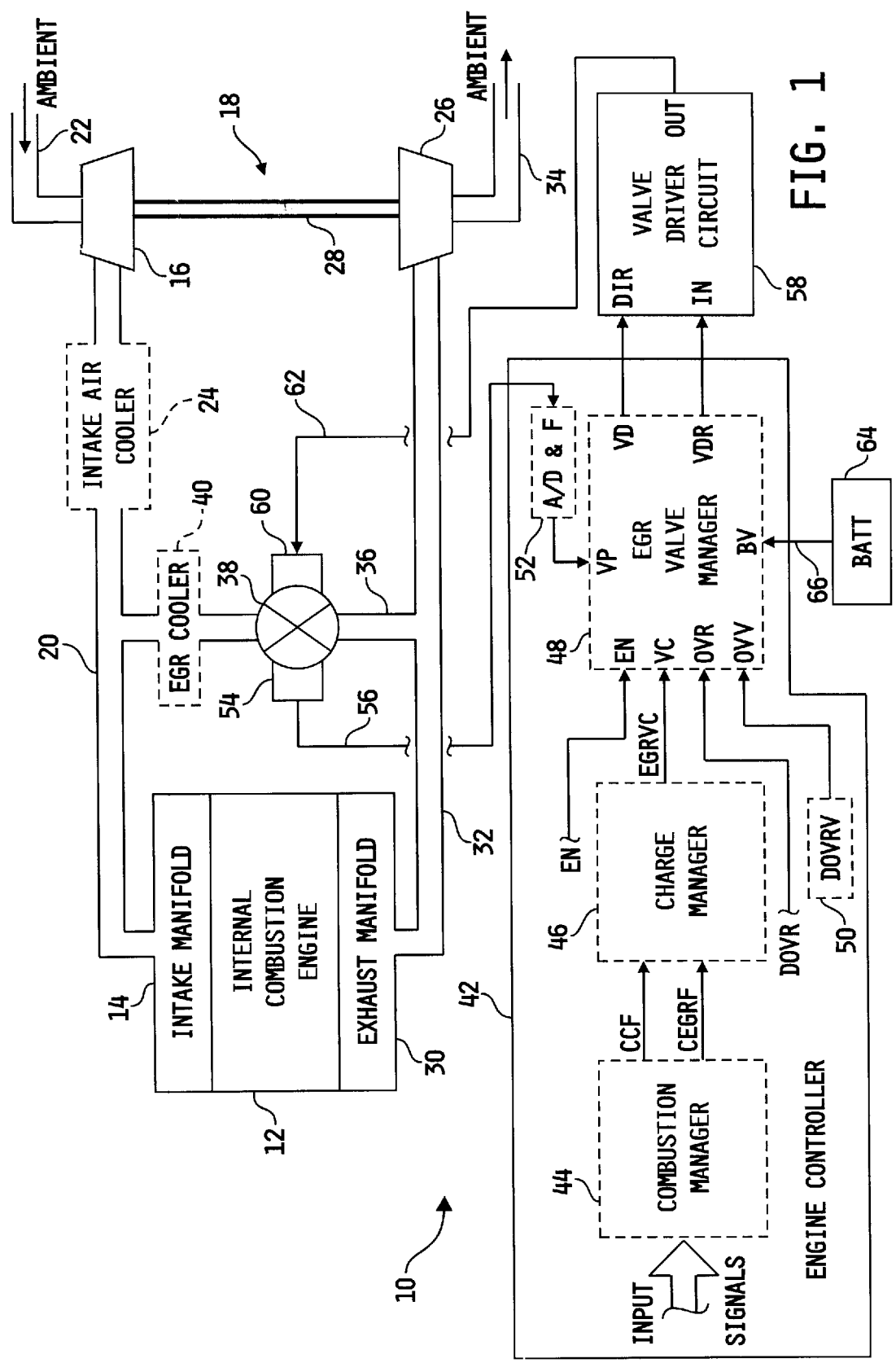
FIG. 1 is a diagrammatic illustration of one preferred embodiment of a system for controlling EGR valve position, in accordance with the present invention.

For the purposes of promoting an understanding of the principles of the invention, reference will now be made to a preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Referring now to FIG. 1, one preferred embodiment of a system 10 for controlling EGR valve position, in accordance with the present invention, is shown. System 10 includes an internal combustion engine 12 having an intake manifold 14 fluidly coupled to a compressor 16 of a turbocharger 18 via intake conduit 20, wherein the compressor 16 receives fresh air via fresh air conduit 22. Optionally, as shown in phantom in FIG. 1, system 10 may include an air intake cooler 24 of known construction disposed in line with intake conduit 20 between the turbocharger compressor 16 and the intake manifold 14. The turbocharger compressor 16 is mechanically coupled to a turbocharger turbine 26 via driveshaft 28, wherein turbine 26 is fluidly coupled to an exhaust manifold 30 of engine 12 via exhaust conduit 32, and is further fluidly coupled to ambient via exhaust conduit 34. The exhaust conduit 32 is also fluidly coupled to intake conduit 20 via an EGR conduit 36 having an EGR valve 38 of known construction disposed in line therewith. An EGR cooler 40 of known construction may optionally be disposed between EGR valve 38 and intake conduit 20 as shown in phantom in FIG. 1.

System 10 includes an engine controller 42 that is preferably microprocessor-based and is generally operable to control and manage the overall operation of engine 12. Engine controller 42 includes a memory unit (not shown) as well as a number of inputs and outputs for interfacing with various sensors and systems coupled to engine 12. Controller 42, in one embodiment, may be a known control unit sometimes referred to as an electronic or engine control module (ECM), electronic or engine control unit (ECU) or the like, or may alternatively be a general control circuit capable of operation as described hereinafter.

Engine controller 42 includes a combustion manager 44 responsive to a number of input signals to produce a commanded charge flow value (CCF) and a commanded EGR fraction value (CEGRF). A charge manager 46 is responsive to the commanded charge flow and EGR fraction values to produce an EGR valve command (EGRVC) for controlling operation of the EGR valve 38. The combustion manager 44 is preferably implemented as one or more control algorithms responsive to a number of engine operating conditions to produce the charge flow and EGR fraction commands (CCF and CEGRF, respectively). An example of one such combustion manager particularly suited for use with the present invention is described in co-pending U.S. patent application Ser. No. 059,619 filed Jan. 29, 2002, entitled SYSTEM FOR PRODUCING CHARGE FLOW IN EGR FRACTION COMMANDS BASED ON ENGINE OPERATING CONDITIONS, which is assigned to the assignee of the present invention, and the disclosure of which is incorporated herein by reference. Likewise, the charge manager 46 is preferably implemented as one or more control algorithms responsive to the commanded charge flow and EGR fraction values, as well as a number of engine operating condition parameters, to produce the EGR valve command signal (EGRVC) as a function thereof. One example of such a charge manager 46 particularly well suited for use with the present invention is described in co-pending U.S. patent application Ser. No. 773,151 filed Jan. 31, 2001, entitled SYSTEM FOR MANAGING CHARGE FLOW AND EGR FRACTION IN AN INTERNAL COMBUSTION ENGINE, and co-pending U.S. patent application Ser. No. 773,654 Jan. 31, 2001, entitled SYSTEM FOR DECOUPLING EGR FLOW AND TURBOCHARGER SWALLOWING CAPACITY/EFFICIENCY CONTROL MECHANISMS, both of which are assigned to the assignee of the present invention, and the disclosures of which are each incorporated herein by reference.

Engine controller 42 further includes an EGR valve manager 48 having a valve command input (VC) receiving the EGR valve command signal (EGRVC) from the charge manager 46. EGR valve manager 48 further includes an enable input (EN) receiving an enable signal (EN) produced internal to engine controller 42. Likewise, engine controller 42 is operable to produce internally a diagnostic override command (DOVR) wherein this value is provided to an override input (OVR) of EGR valve manager 48. Engine controller 42 further includes a diagnostic override value (DOVRV) stored therein within block 50, wherein the diagnostic override value is provided to an override value input (OVV) of EGR valve manager 48.

System 10 further includes an EGR valve position sensor 54 electrically connected to an analog-to-digital (A/D) converter and filter block 52 via signal path 56. Sensor 54 is preferably of known construction and is operable to produce a signal on signal path 56 indicative of the position of EGR. valve 38 relative to a reference position. EGR valve manager 48 includes an EGR valve position input (VP) receiving the converted and filtered EGR valve position signal from A/D and filter block 52. System 10 further includes a vehicle battery 64 having a battery voltage line 66 electrically connected to a battery voltage input (BV) of the EGR valve manager 48, wherein manager 48 is operable to monitor the voltage level of battery 64 via input BV thereof. The EGR valve manager 48 is responsive to the various input signals thereto to produce a valve drive signal (VDR) and a valve direction signal (VD) at respective outputs thereof.

System 10 further includes a valve driver circuit 58 having a signal input (IN) receiving the valve drive signal (VDR) from EGR valve manager 48, and a direction input (DIR) receiving the valve direction signal (VD) from EGR valve manager 48. Valve driver circuit 58 is electrically connected to a valve actuator 60 associated with EGR valve 38 via signal path 62. Preferably, valve actuator 60 is a motor or other known actuator driven by a valve driver circuit 58 in accordance with the EGR valve command signal (EGRVC) processed by EGR valve manager 48 in accordance with the present invention. In one embodiment, valve actuator is a DC motor driven by an H-bridge circuit 58 producing a PWM signal having a duty cycle and direction that is controlled by EGR valve manager 48.

Referring now to FIG. 2, one preferred embodiment of the valve manager block 48 of FIG. 1, in accordance with the present invention, is shown. Block 48 includes an input processor 70 having an enable input (EN) defining the enable input of block 48, a valve command input (VC) defining the valve command input of block 48, an override input (OVR) defining the override input of block 48 and a valve position input (VP) receiving EGR valve position information from A/D and filter circuit 52. Input processor 70 includes a control state output (CS) providing a control state value to input CS of a PID controller 72. A valve position reference output (VPR) provides a valve position reference value to a VPR input of PID controller 72, and input processor 70 provides a number of gain values to corresponding gain value inputs of PID controller 72. For example, processor 70 provides proportional gain (PG), integral gain (IG) and derivative gain (DG) to corresponding inputs of PID controller 72. Additionally, input processor 70 provides a feed-forward term (FF) to a corresponding input of PID controller 72 as well as an integrator lower limit term (ILL) to a corresponding input of controller 72. Input processor 70 further provides a pre-filter constant value (PC) to a PC input of PID controller 72, and controller 72 further includes an EGR valve position input (VP) receiving the EGR valve position signal from A/D and filter circuit 52. PID controller 72 is operable, as will be described hereinafter, to process the foregoing input signals and produce a corresponding output signal at output OUT, which is provided to a valve command input (VC) of an output processor 74. Output processor 74 further includes a control state input (CS) receiving the control state value from input processor 70, an override value input (OVV) defining the OVV input of the EGR valve manager block 48 and a battery voltage input (BV) monitoring the battery voltage produced by battery 64. Output processor 74 is operable to produce a battery compensation output (BC) which is fed back to a battery compensation input (BC) of PID controller 72. Additionally, output processor 74 is operable to produce the valve drive signal (VDR) and the valve direction signal (VD) produced by block 48.

Figure 3:
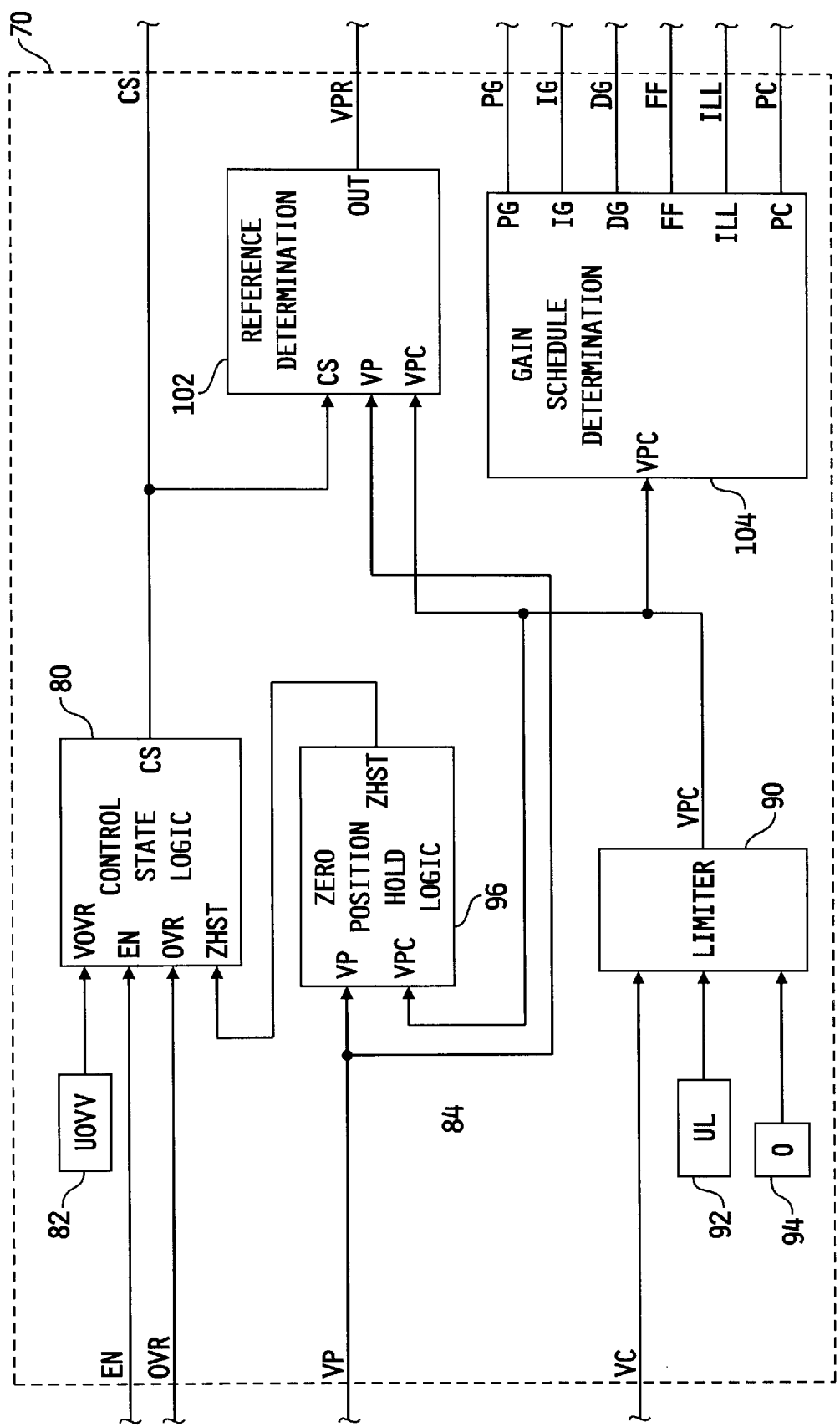
FIG. 3 is a diagrammatic illustration of one preferred embodiment of the input processor block forming part of the EGR valve manager block of FIG. 2, in accordance with the present invention.

Referring now to FIG. 3, one preferred embodiment of the input processor block 70 of FIG. 2, in accordance with the present invention, is shown. Block 70 includes a control state logic block 80 having a valve override input (VOVR) receiving a user override value (UOVV) from block 82. Additionally, control state logic block 80 defines the enable input (EN) and the override input (OVR) of input processor 70, and includes a zero hold status input (VHST) connected to a zero hold status output of a zero position hold logic block 96.

The valve command input (VC) of block 70 is provided to one input of a limiter block 90 having a second input receiving an upper limit value (UL) from block 92, and a zero value from block 94 establishing a lower limit value for limiter 90. A valve position command output of limiter 90 is provided to a valve position command input (VPC) of zero position hold logic block 96 having a second input connected to the valve position input (VP) of block 70.

The valve position command value (VPC) produced by limiter 90 is further supplied to a valve position command input (VPC) of a reference determination block 102 having a second input connected to the valve position input (VP) of block 70 and a control state input (CS) receiving the control state output of the control state logic block 80 which also defines the control state output (CS) of input processor block 70. The valve position command value (VPC) produced by limiter 90 is also supplied to a valve position command input (VPC) of a gain schedule determination block 104 defining outputs PG, IG, DG, FF, ILL and PC of input processor block 70.

Referring now to FIG. 4, one preferred embodiment of the control state logic block 80 of FIG. 3, in accordance with the present invention, is shown. Block 80 includes a first true/false block 110 having a control input receiving a zero hold status input (ZHST) from the zero position hold logic block 96, a second input receiving a zero hold state value (ZHS) from block 112, and a third input receiving a closed loop state value (CLS) from block 114. An output of true/false block 110 is supplied to one input of a second true/false block 116 having a control input defining the valve override input (VOVR) of block 80, and a third input receiving a user override state value (UOS) from block 118.

A third true/false block 120 has a first input receiving the output of true/false block 116, a control input defining the override input (OVR) of control state logic block 80 and a third input receiving an override state value (OS) from block 122. The output of true/false block 120 is provided to one input of a fourth true/false block 124 having a control input connected to an output of a NOT block 126 having an input defining the enable input (EN) of the control state logic block 80. A third input of true/false block 124 receives a disable state value (DS) from block 128, and an output of true/false block 124 defines the control state output of block 80.

Referring now to FIG. 5, one preferred embodiment of the zero position hold logic block 96 of the input processor 70 of FIG. 3, in accordance with the present invention, is shown. Block 96 includes a "less than or equal to" arithmetic operator block 140 having a first input receiving a zero position threshold value ($ZP_{TH}$) from block 142 and a second input receiving the valve position value (VP) from block 98 (FIG. 3). An "equal to" arithmetic operator block 144 has a first input receiving a zero value from block 146 and a second input receiving the valve position command value (VPC) produced by limiter block 90 (FIG. 3). Outputs of the arithmetic operator blocks 140 and 144 are provided as inputs of a two-input AND block 148 defining the zero hold state output (VHST) of block 96.

Figure 6:
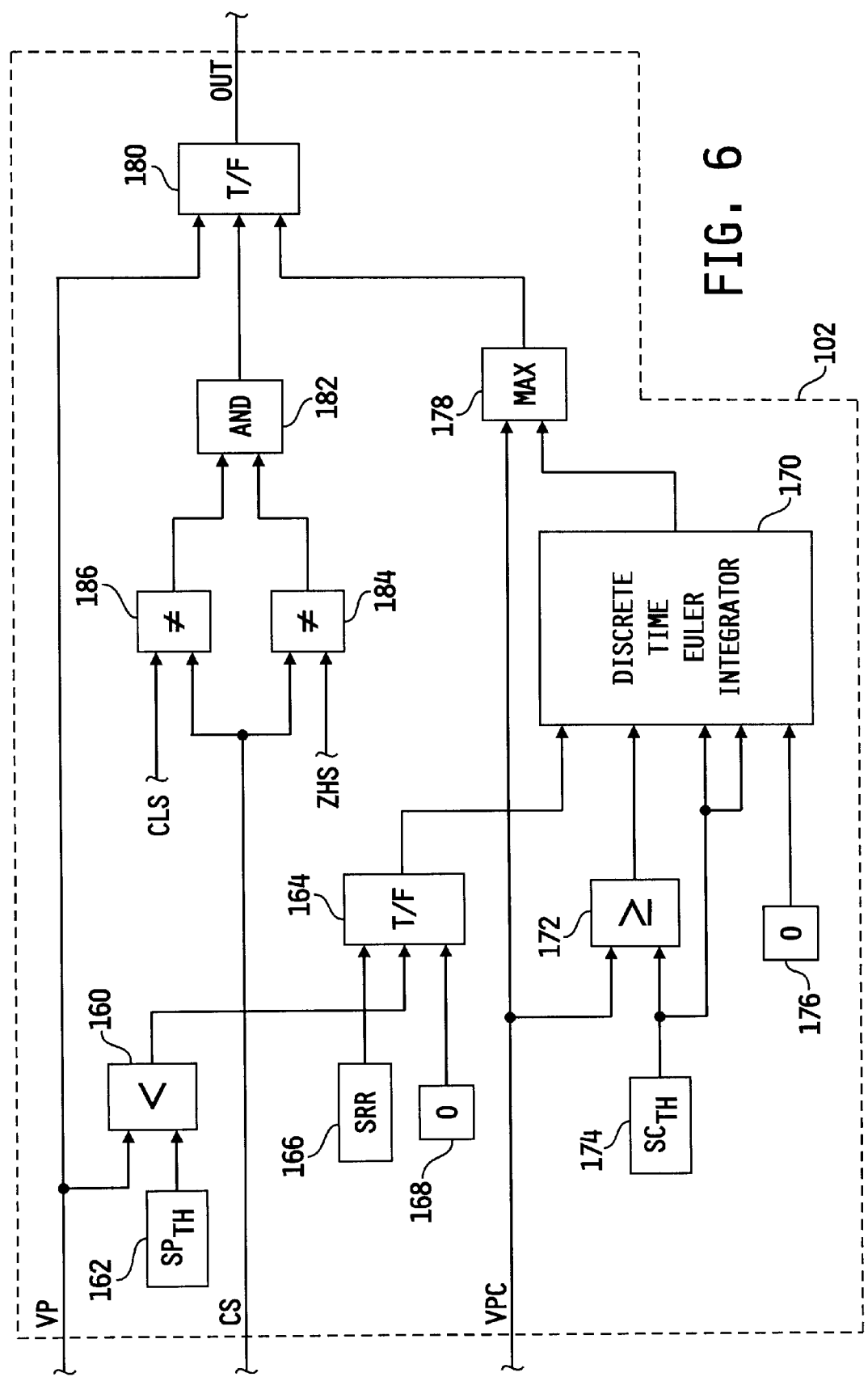
FIG. 6 is a diagrammatic illustration of one preferred embodiment of the reference determination block forming part of the input processor block of FIG. 3, in accordance with the present invention.

The functions of the zero position hold logic block 96 and control state logic block 80 are to provide the remaining components of the EGR valve manager 48 with an indication of the presently selected control state of manager 48; i.e., closed-loop control, zero position hold or any of a number of open loop states. Referring to FIG. 5, the arithmetic block 140 is operable to compare the current EGR valve position (VP) with a zero valve position (e.g., EGR valve closed position) threshold $ZP_{TH}$. Likewise, arithmetic block 144 is operable to compare the current EGR valve command value (VPC) with a valve close command (e.g., 0). If the EGR valve command value VPC equals zero, corresponding to a valve close command, and if the actual EGR valve position is below a valve closed threshold value ($ZP_{TH}$), the zero hold status value (ZHST) is set to a high logic level to indicate that the EGR valve 38 is currently being held at its closed (no flow) position. Otherwise, the zero hold status value (ZHST) is set to a logic low level. Referring to FIG. 6, the true/false block 110 is responsive to the state of the zero hold status value (ZHST) produced by block 96 of FIG. 5 to select between a zero hold state of operation and a closed-loop state of operation. If ZHST is set to a logic high level, the true/false block 110 produces ZHS at its output. If, on the other hand, ZHS is set to a logic low level, indicating that the EGR valve 38 is not currently at its zero, or closed position, the control state logic block 80 assumes that closed-loop control is preferred and true/false block 110 thus produces CLS at its output. True/false blocks 116, 120 and 124 provide for user, diagnostic and controller output enable overrides of either the zero hold or closed-loop operational state selected by true/false block 110, wherein such override states correspond to open-loop control of the EGR valve manager block 48. The control state output (CS) of block 80 thus provides an indication as to which of the foregoing operational states is selected.

Referring now to FIG. 6, one preferred embodiment of the reference determination block 102 of the input processor block 70, in accordance with the present invention, is shown. Block 102 includes a "less than" arithmetic operator block 160 having a first input receiving the valve position value (VP) from the A/D and filter block 52 of FIG. 1 and a second input receiving a stage position threshold value ($SP_{TH}$) from block 162. An output of arithmetic operator block 160 is provided as a control input to a true/false block 164 having a second input receiving a stage ramp rate value (SRR) from block 166 and a third input receiving a zero value from block 168. An output of true/false block 164 is provided as an input to a discreet time Euler integrator 170. A second input of integrator 170 receives an output of a "greater than or equal to" arithmetic operator block 172 having a first input defining the valve position command input (VPC) of block 102 and a second input receiving a stage command threshold value ($SC_{TH}$) from block 174. A third input of integrator 170 receives a zero value as a lower integration limit from block 176, and includes fourth and fifth inputs receiving the stage command threshold value ($SC_{TH}$) from block 174. The output of integrator block 170 is provided to a first input of a MAX block having a second input receiving the valve position command value (VPC). An output of MAX block 178 is provided to one input of a true/false block 180 having a second input receiving the valve position command (VP) provided by block 52.

An inequality arithmetic operator block 184 has a first input receiving the zero hold state value (ZHS) from block 112 of FIG. 4, and a second input defining the control state input (CS) of reference determination block 102. A second inequality arithmetic operator block 186 has a first input receiving the control state value (CS) and a second input receiving the closed loop state value (CLS) from block 114 of FIG. 4. Outputs of arithmetic operator blocks 184 and 186 are provided as inputs to a two-input AND block 182 having an output provided to a control input of a true/false block 180. An output of true/false block 180 defines the output (OUT) of the reference determination block 102 which, in turn, defines the valve position reference value (VPR) produced by the input processor block 70.

In the operation of reference determination block 102, true/false block 180 is operable to selectively produce as an output of block 102 either the valve position signal produced by block 52 (FIG. 1) or the output of MAX block 178, depending upon the operational state selected by the control state logic block 80 and indicated by CS. If CS corresponds to any of the open-loop control states described hereinabove with respect to FIG. 4, the output of AND block 182 is set to a high logic level and true/false switch 180 thus selects the EGR valve position value (VP) as the valve position reference value (VPR). In all open-loop control modes, block 80 is thus operable to continuously update the EGR valve position reference value (VPR) with the current EGR valve position.

If, on the other hand, the control state value CS matches either of the closed-loop state indicator CLS or the zero hold state indicator ZHS, the output of the AND block 182 is set to a low logic level and true/false block 180 is operable to produce as its output the output of MAX block 178. In this mode, the valve position command (VPC) is compared to a stage command threshold value ($SC_{TH}$), wherein $SC_{TH}$ corresponds to valve command threshold above which a valve closing command is presumed. As long as the valve position command remains below $SC_{TH}$, the integrator 170 is disabled and the MAX block 178 produces the lagging output of the integrator as its output. In this case, the valve position reference value (VPR) produced by the reference determination circuit 102 is controlled by VPC to rapidly control the operation of EGR valve 38 under non-closing events. If, however, the valve position command value (VPC) exceeds the stage command threshold value $SC_{TH}$, the output of arithmetic block 172 enables integrator 170, wherein integrator 170 is operable to integrate between the integrator lower limit of zero (produced by block 176) and the integrator upper limit produced by the output of true/false block 164. The output of true/false block 164 is controlled by a comparison between the actual position (VPC) of the EGR valve 38 and a stage position threshold value $SP_{TH}$, wherein $SP_{TH}$ corresponds to a position of EGR valve 38 near its closed position. If the EGR valve 38 is greater than $SP_{TH}$, the output of true/false block 164 (and hence the integrator upper limit value) is zero and the integrator 170 is thus operable to produce a value of zero, and the output of the MAX block 178 is equal to the valve position command (VPC). Thus, during a valve closing event, the valve position reference value (VPR) is identical to the valve position command value (VPC) as long as the valve position VP is greater than a distance $SP_{TH}$ away from its closed position, thereby causing the EGR valve to rapidly approach its closed position in a stepwise fashion. However, when the EGR valve position VP reaches the position corresponding to $SP_{TH}$, the output of block 160 switches to a high logic value, thereby causing true/false block 164 to establish as the upper integration limit of the integrator 170 a stage ramp rate value SRR produced by block 166. Preferably, the value Of $SP_{TH}$ is selected such that the EGR valve 38 in this position is as close as practicable to the valve seat (i.e., the valve closed position) with a sufficient error band provided so as to tolerate a reasonable amount of overshoot in the rapid step change in valve position resulting from the staged valve closing event with enough margin between the valve and valve seat provided for so that contact therebetween is avoided.

The integrator 170 is responsive to the upper integration limit SRR to dominate the output of MAX block 178, thereby providing for a slower ramp of the EGR valve from the valve position $SP_{TH}$ to its closed position. The value of SRR is chosen to establish a desired integration rate of integrator 170 to thereby establish a desired valve ramp rate between $SP_{TH}$ and the valve closed position. In this manner, a controlled continuous ramp of the EGR valve 38 from valve position $SP_{TH}$ to its valve seat ensures that the EGR valve and/or valve seat will not sustain damage resulting from a valve closing event.

Figure 7:
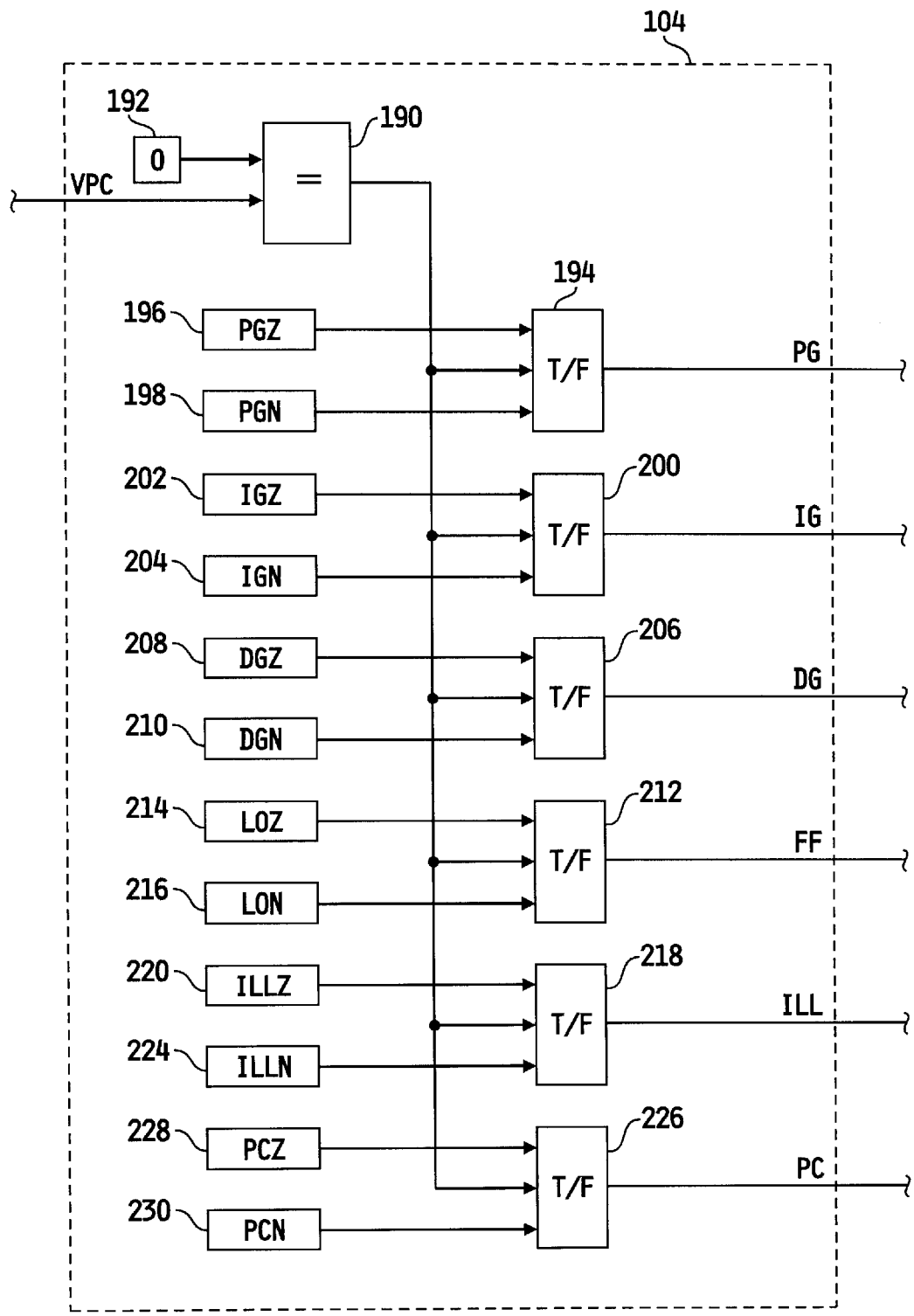
FIG. 7 is a diagrammatic illustration of one preferred embodiment of the gain schedule determination block forming part of the input processor block of FIG. 3, in accordance with the present invention.

Referring now to FIG. 7, one preferred embodiment of the gain schedule determination block 104 forming part of the input processor block 70, in accordance with the present invention, is shown. Block 104 includes an "equals" arithmetic operator block 190 having a first input receiving a zero value from block 192 and a second input defining the valve position command input (V,PC) of the gain schedule determination block 104. An output of block 190 defines control inputs of true/false blocks 194, 200, 206, 212, 218 and 226. A second input of true/false block 194 receives a proportional gain zero value (PGZ) from block 196, and a third input of block 194 receives a proportional gain normal value (PGN) from block 198. The output of true/false block 194 produces the proportional gain value (PG) produced by the gain schedule determination block 104 and by the input processor block 70. A second input of true/false block 200 receives an integral gain zero value (IGZ) from block 202, and a third input of block 200 receives an integral gain normal value IGN) from block 204. The output of true/false block 200 produces the integral gain value (IG) produced by blocks 104 and 70. A second input of true/false block 206 receives a differential gain zero value (DGZ) from block 208, and a third input of block 206 receives a differential gain normal value (DGN) from block 210. The output of true/false block 206 defines the differential gain value (DG) produced by blocks 104 and 70. A second input of true/false block 212 receives a load offset zero value (LOZ) from block 214, and a third input of block 212 receives a load offset normal value (LON) from block 216. An output of true/false block 212 defines the feed-forward output (FF) produced by the gain schedule determination block 104 and the input processor block 70. A second input of true/false block 218 receives an integration lower limit zero value (ILLZ) from block 220, and a third input of block 218 receives an integration lower limit normal value (ILLN) from block 224. The output of true/false block 218 defines the integration lower limit output (ILL) of blocks 104 and 70. A second input of true/false block 226 receives a prefilter constant zero value (PCZ) from block 228, and a third input of block 226 receives a prefilter constant normal value (PCN) from block 230. An output of true/false block 226 defines the prefilter constant output (PC) produced by blocks 104 and 70.

In operation, the gain scheduling block 104 is operable to select a first set of system gains (i.e., the zero or "Z" gain values) if the valve position command (VPC) is equal to zero, thereby indicating a valve close command. If, on the other hand, the valve position command is not equal to zero, thereby indicating a non-valve closing event, the gain scheduling block 104 is operable to select a second set of system gains (i.e., the normal or "N" gain values). Preferably, the zero gain values are larger or more aggressive than the normal gain values such that the overall response of the EGR valve manager 48 is faster for during EGR valve closing events than during non-valve closing events.

Figure 8:
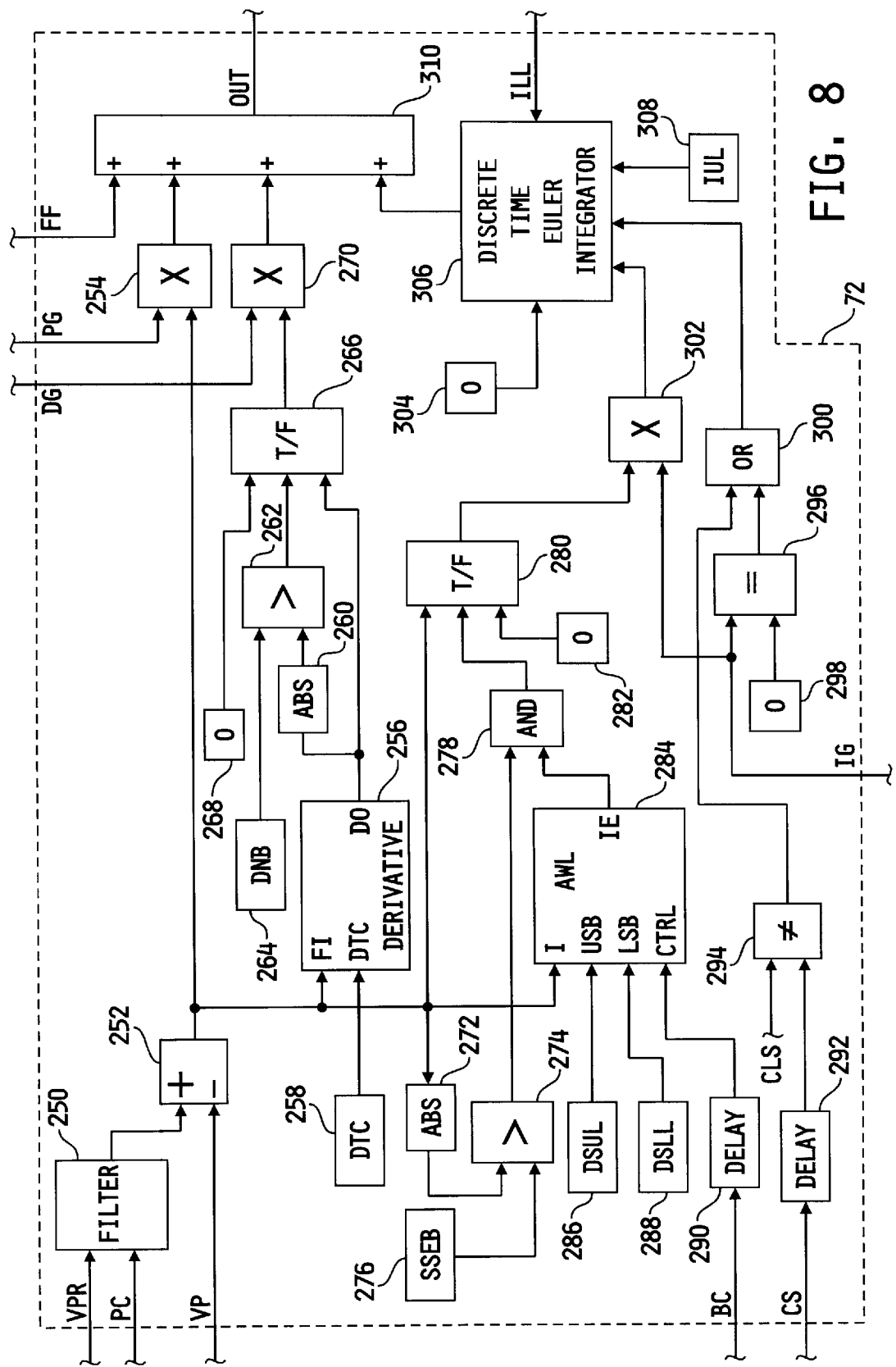
FIG. 8 is a diagrammatic illustration of one preferred embodiment of the PID controller block forming part of the EGR valve manager block of FIG. 2, in accordance with the present invention.

Referring now to FIG. 8, one preferred embodiment of the PID controller 72 of the EGR valve manager 48, in accordance with the present invention, is shown. Controller 72 includes a filter 250 having a first input receiving the valve position reference signal (VPR) produced by the input processor block 70 and a second input receiving the prefilter constant value (PC) produced by the gain schedule determination block 104. Filter 250, in one embodiment, is a core first order filter, although the present invention contemplates providing for other filter structures. In any case, the output of filter 250 is provided to an addition input of a summation block 252 having a subtraction input receiving the valve position value (VP). An output of summation block 252 is provided to one input of a multiplication block 254 having a second input receiving the proportional gain value (PG) produced by the gain schedule determination block 104. The output of summation block 252 is further provided to a filter input (FI) of a derivative block 256 having a discreet filter time constant input (DTC) receiving a discreet time constant value (DTC) from block 258. A derivative output (DO) of derivative block 256 is provided as an input to an absolute value block (ABS) 260 having an output provided to a first input of a "greater than" arithmetic operator block 262 having a second input receiving a derivative noise band value (DNB) from block 264. An output of the arithmetic operator block 262 is provided as a control input to a true/false block 262 having a second input receiving the derivative output (DO) from derivative block 256 and a third input receiving a zero value from block 268. An output of true/false block 266 is provided as a first input to a multiplication block 270 having a second input receiving the derivative gain value (DG) produced by gain schedule determination block 104.

The output of summation block 252 is further provided as an input to an absolute value block 272 having an output provided to a first input of a "greater than" arithmetic operator block 274 having a second input receiving a steady state error band value (SSEB) from block 276. An output of arithmetic operator block 274 is provided as a first input to an AND block 278. An output of AND block 278 is provided as a control input to a true/false block 280 having a second input receiving the output of summation block 252, and a third input receiving a zero value from block 282.

An anti-windup logic block 284 includes an input (I) receiving the output of summation block 252, an upper saturation boundary input (USB) receiving a drive signal upper limit value (DSUL) from block 286, and a lower saturation boundary input (LSB) receiving a drive signal lower limit value (DSLL) from block 288. A delay block 290 has an input defining the battery compensation input (BC) of PID controller 72, and an output provided to a control input (CTRL) of the anti-windup logic block 284. An integration enable output (IE) of the anti-windup logic block 284 is provided to the second input of AND block 278.

Another delay block 292 has an input defining the control state input (CS) of the PID controller 72 and an output provided as a first input to an inequality arithmetic operator block 294 having a second input receiving the closed loop state value (CLS) produced by block 114 (FIG. 4). An "equals" arithmetic operator block 296 has a first input defining the integral gain input (IG) of PID controller 72, and a second input receiving a zero value from block 298. An output of block 296 is provided as a first input of a two-input OR block 300 having a second input receiving the output of arithmetic operator block 294. The output of OR block 300 is provided as a first input to a discreet time Euler integrator block 306. The integral gain input (IG) of block 72 is further provided as a first input to a multiplication block 302 having a second input receiving the output of true/false block 280. An output of multiplication block 302 is provided as a second input to the discreet time Euler integrator block 306. A third input of integrator block 306 receives an upper integration limit (IUL) from block 308, and a fourth input defining the lower integration limit input (ILL) of the PID controller 72. A fifth input of integrator block 306 receives a zero value from block 304, and an output of integrator block 306 as provided to an addition input of a summation block 310. Second and third addition inputs of summation block 310 receive the outputs of multiplication blocks 254 and 270, respectively, and a fourth addition input defines the feed-forward input (FF) of the PID controller block 72. The output of summation block 310 defines the output (OUT) of PID controller block 72.

Figure 9:
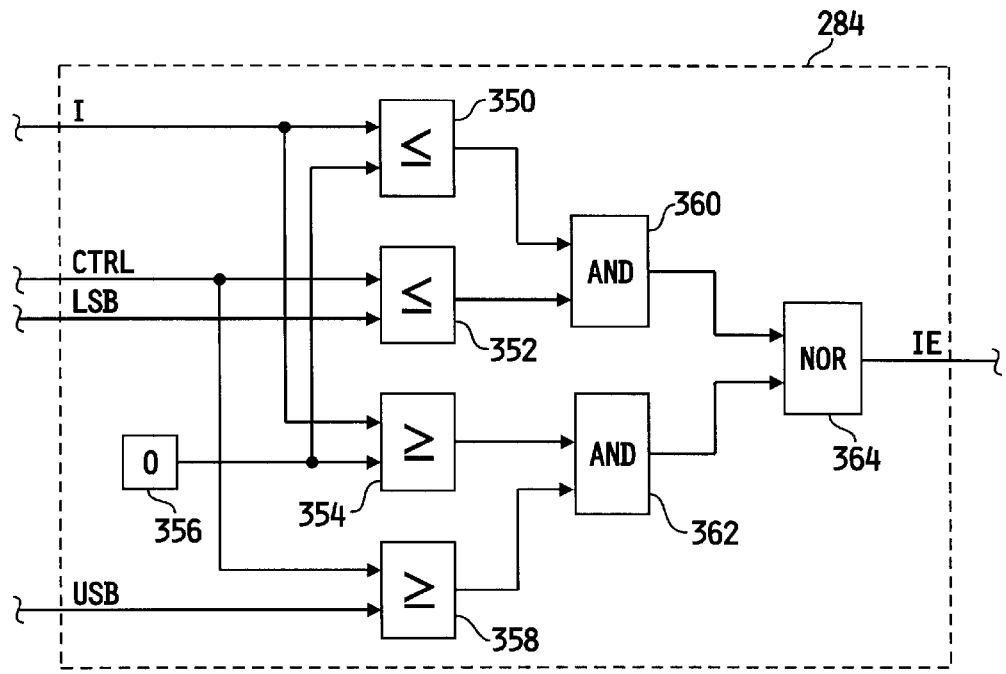
FIG. 9 is a diagrammatic illustration of one preferred embodiment of the anti-windup logic block forming part of the PID controller block of FIG. 8, in accordance with the present invention.

Referring now to FIG. 9, one preferred embodiment of the anti-windup logic block 284 of the PID controller 72, in accordance with the present invention, is shown. Block 284 includes a "less than or equal to" arithmetic block 350 having a first input defining the input (I) of block 284 and a second input receiving a zero value from block 356. A second "less than or equal to" arithmetic operator block 352 has a first input defining the control input (CTRL) of block 284, and a second input defining the lower saturation boundary input (LSB) of block 284. Outputs of arithmetic operator blocks 350 and 352 are each provided as inputs to a two-input AND logic block 360. A "greater than or equal to" arithmetic operator block 354 has a first input connected to the input (I) of block 284, and a second input receiving the zero value from block 356. A second "greater than or equal to" arithmetic operator block 358 has a first input connected to the control input (CTRL) of block 284 and a second input defining the upper saturation boundary input (USB) of block 284. Outputs of the arithmetic operator blocks 354 and 358 are each provided as inputs to a two-input AND logic block 362 having an output provided to one input of a NOR logic block 364 having a second input receiving the output of AND logic block 360. The output of NOR logic block 364 defines the integrator enable output (IE) of the anti-windup logic block 284.

In operation, the integrator enable output (IE) of the anti-windup logic block 284 is set to an integrator disable state whenever the delayed battery voltage (BV) is greater than the drive signal upper limit DSUL and the error input (VPC–VP) is greater than zero. Likewise, integrator enable output (IE) of the anti-windup logic block 284 is set to an integrator disable state whenever the delayed battery compensation value (BC) is less than the drive signal lower limit DSLL and the error input (VPC–VP) is less than zero. In all other cases, the integrator output (IE) of the anti-windup logic block 284 is set to an integrator enable state. The integrator enable output of block 284 is operable to control the output of AND block 278 such that the true/false block 280 selects zero as its output, and thereby disables integrator 306, whenever the integrator enable output (IE) of block 284 is set to an integrator disable state. The switch points of the anti-windup logic block 284 are tied to the previous (e.g., one-frame delayed) battery voltage value such that the integrator 306 is disabled if the battery voltage goes out of range high or low (as compared with DSUL and DSLL). If, however, the output of the anti-windup logic block 284 is set to an integrator enable state, the integrator 306 is enabled and the integral gain value IG is provided thereto via block 302. The steady state error band value SSEB is compared to an absolute value of the error value (VPR–VP) and is used to selectively disable the integrator 306 to prevent limit cycles due to system non-linearities while ensuring steady state accuracy to an acceptable error range. If the system is not operating in closed-loop mode, the output of block 294 ensures that the integrator is present to zero to provide a smooth transition back to closed-loop control.

The feedforward term FF is obtained from the gain scheduling block 104 described hereinabove and the proportional gain term is produced by multiplication block 254 simply as the product of the error term (VPR–VP) and the proportional gain term PG. In determining the derivative term, an absolute value of the derivative output (DO) produced by block 256 is compared with a deadband DNB. If DNB is greater than the absolute value of DO, the true/false block produces zero as its output. Otherwise, the derivative output (DO) is produced at the output of true/false block 266. The deadband logic is included to remove small noisy derivatives and thereby prevent chattering of the EGR valve 38 under steady state conditions. In any case, the output of the true/false block 266 is multiplied by the derivative gain value DG to produce the derivative gain term. The feedforward term, the proportional gain term, the derivative gain term and the integral gain term are all summed at block 310 to produce the closed-loop PID governor duty cycle output value.

Figure 10:
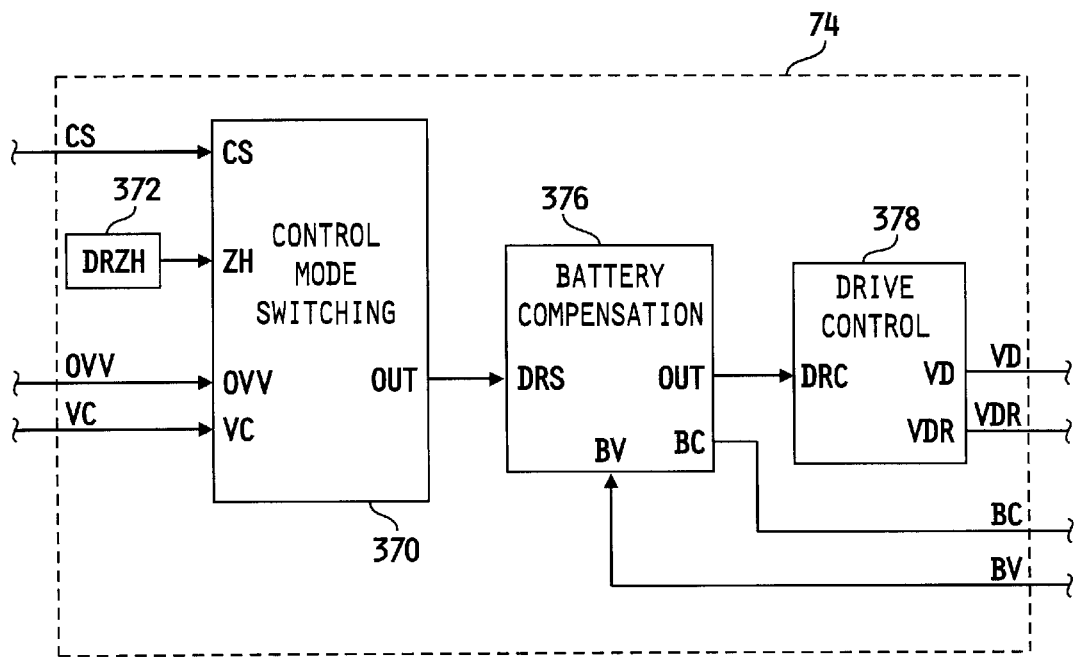
FIG. 10 is a diagrammatic illustration of one preferred embodiment of the output processor block forming part of the EGR valve manager block of FIG. 2, in accordance with the present invention.

Referring now to FIG. 10, one preferred embodiment of the output processor block 74 of the EGR valve manager block 48, in accordance with the present invention, is shown. Block 74 includes a control mode switching block 370 having a control state input (CS) connected to the control state input (CS) of the output processor block 74, an override value input (OVV) connected to the override value (OVV) input of processor 74 and a valve command input (VC) connected to the valve command input (VC) of the output processor block 74. The control mode switching block 370 further includes a zero hold input (ZH) receiving a drive signal zero hold value (DRZH) from blocks 372, wherein DRZH is preferably sized to cause the output processor block 74 to drive the EGR valve 38 sufficiently to maintain valve 38 in a closed position during valve closing events. An output (OUT) of control mode switching block 370 is provided to a drive signal input (DRS) of a battery compensation block 376 having a battery voltage input (BV) monitoring the voltage of battery 64. A battery compensation output (BC) of battery compensation block 376 defines the battery compensation output (BC) of the output processor 74, and a second output (OUT) of battery compensation block 376 is provided to a drive control input (DRC) of a drive control block 378. A valve drive output (VDR) of drive control block 378 defines the drive control output of output processor block 74 and of the EGR valve manager 48, and a valve direction output (VD) defines the valve direction outputs (VD) of the output processor block 74 and EGR valve manager 48. The valve drive output (VDR) is preferably a PWM signal having a duty cycle defined by valve control manager 48.

Figure 11:
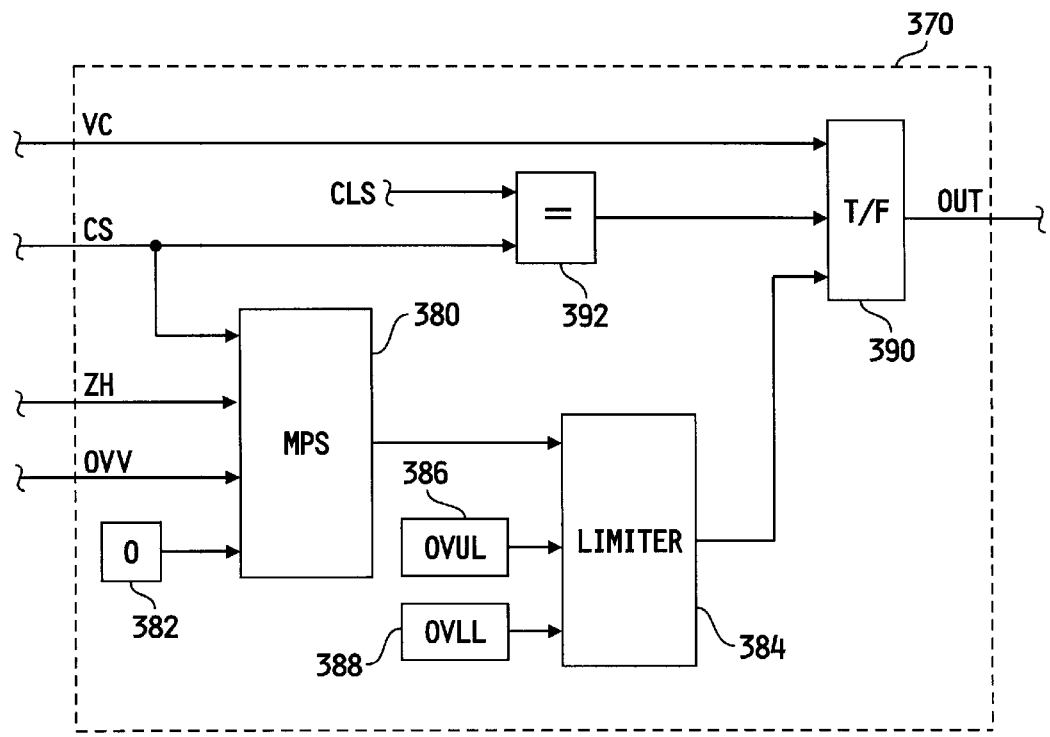
FIG. 11 is a diagrammatic illustration of one preferred embodiment of the control mode switching block forming part of the output processor block of FIG. 10, in accordance with the present invention.

Referring now to FIG. 11, one preferred embodiment of the control mode switching block 370 of the output processor block 74, in accordance with the present invention, is shown. Block 370 includes a multi-part switching block 380 having a first input connected to the control state input (CS) of block 370, a second input connected to the zero hold input (ZH) of block 370, a third input connected to the override value input (OVV) of block 370 and a fourth input receiving a zero value from block 382. An output of the multi-part switching block 380 is provided as an input to a limiter block 384 receiving an override value upper limit (OVUL) from block 386 and an override lower limit value (OVLL) from block 388. An output of limiter block 384 is provided as one input to a true/false block 390. An "equals" block 392 has a first input connected to the control state input (CS) of block 370 and a second input receiving the CLS value from block 114 (FIG. 4). An output of block 392 provides a control input to true/false block 390, wherein true/false block 90 includes a third input connected to the valve command input (VC) of block 370. The output of true/false block 390 defines the output (OUT) of the control mode switching block 370.

In operation, the output of block 392 is true only if the current control state of the EGR valve manager 48 is closed-loop control. In this case, the output of the control mode switching block 370 corresponds to the valve command value (VC). If not under closed-loop control, the multi-port switch 380 is operable to select an appropriate control mode based on CS, wherein true/false switch 390 is operable to provide an override-limited representation of this control mode value as the output of block 370.

Figure 12:
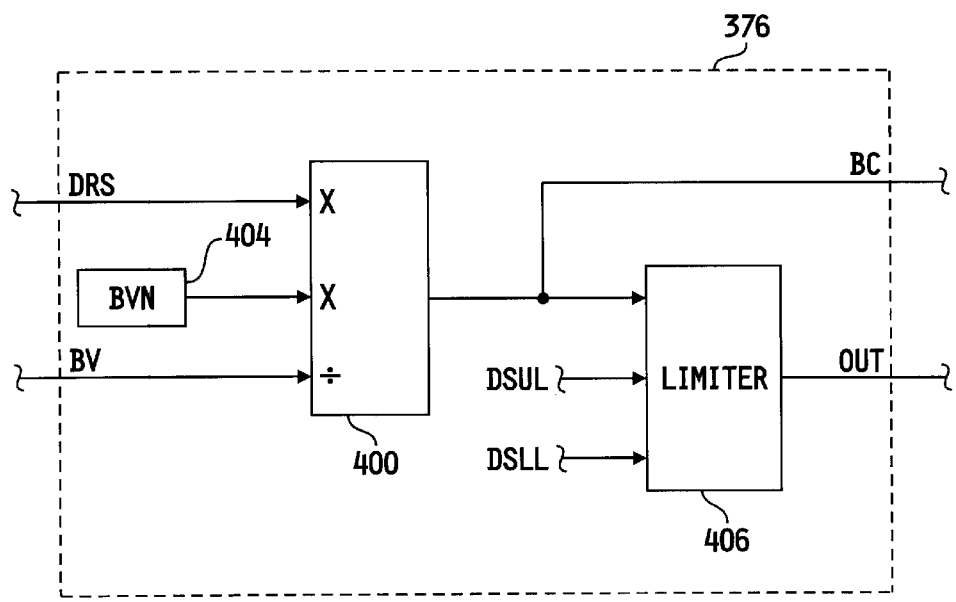
FIG. 12 is a diagrammatic illustration of one preferred embodiment of the battery compensation block forming part of the output processor block of FIG. 10, in accordance with the present invention.

Referring now to FIG. 12, one preferred embodiment of the battery compensation block 376 of the output processor block 70, in accordance with the present invention, is shown. Block 376 includes an arithmetic block 400 having a multiplication input connected to the drive signal input (DRS) of block 376, a second multiplication input receiving a nominal battery voltage value (BVN) from block 404, and a division input monitoring the battery voltage value (BV) of battery 64. An output of arithmetic block 400 is provided as an input to a limiter block 406 having an upper limit input receiving the drive signal upper limit value (DSUL) from block 286 (FIG. 8) and a lower limit input receiving the drive signal lower limit value (DSLL) from block 288 (FIG. 8). An output of arithmetic block 400 defines the battery compensation output (BC) of block 376, and the output of limiter block 406 defines the output (OUT) of the battery compensation block 376. The battery compensation value used by the PID controller as described with respect to FIG. 8 is inversely proportional to the actual battery voltage of battery 64. The battery compensation block 376 is thus operable to adjust the duty cycle of the PWM output signal (VDR of output processor block 74) by a gain factor that is inversely proportional to battery voltage (BV).

Figure 13:
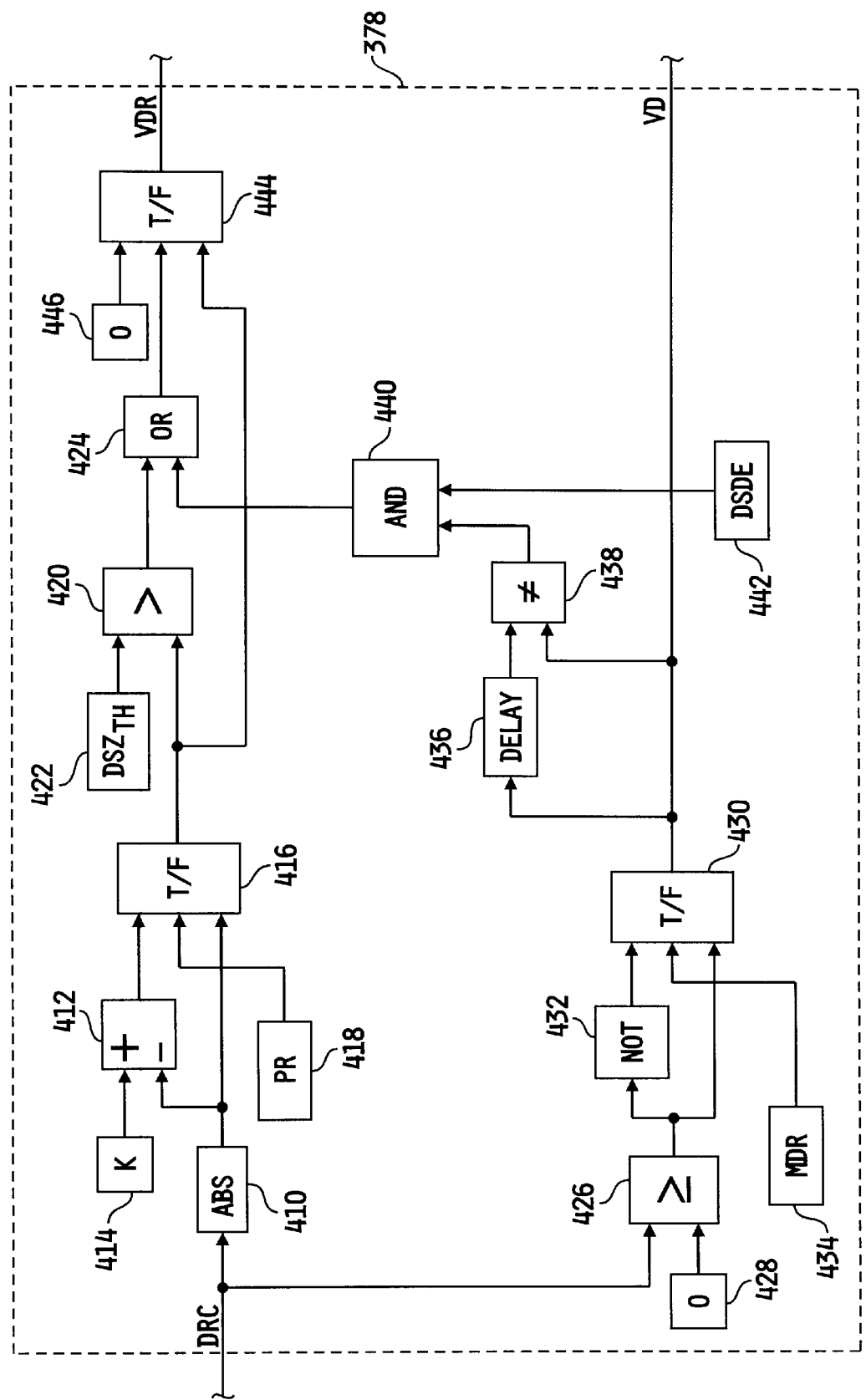
FIG. 13 is a diagrammatic illustration of one preferred embodiment of the drive control mode block forming part of the output processor block of FIG. 10, in accordance with the present invention.

Referring now to FIG. 13, one preferred embodiment of the drive control block 378 of the output processor block 74, in accordance with the present invention, is shown. Block 378 includes an absolute value block 410 having an input connected to the drive control input (DRC) of block 378, and an output connected to a subtraction input of a summation block 412 having an addition block receiving a constant value K from block 414. An output of summation block 412 is provided as a first input to a true/false block 416 having a second input receiving the output of absolute value block 410, and having a control input receiving a polarity reversal value (PR) from block 418. An output of true/false block 416 is provided as a first input to a "greater than" arithmetic operator block 420 having a second input receiving a drive signal zero threshold value ($DSZ_{TH}$) from block 422. An output of arithmetic operator block 420 is provided as one input to a two-input OR block 424.

A "greater-than or equal to" arithmetic operator block 426 has a first input connected to the drive command input (DRC) of block 378, and a second input receiving a zero value from block 428. An output of arithmetic operator block 426 is provided to an input of a NOT block 432 having an output connected to one input of a true/false block 430 having a second input connected to the output of arithmetic operator block 426. A control input of true/false block 430 receives a motor direction reversal value (MDR) from block 434. An output of true/false block 430 is provided as an input to a delay block 436 having an output connected to one input of an inequality arithmetic operator block 438 having a second input receiving the output of true/false block 430. The output of true/false block 430 also defines the valve direction output (VD) of drive control block 378, output processor block 74 and EGR valve manager 48. The output of arithmetic operator block 438 is provided as one input of a two-input AND logic block 440 having a second input receiving a drive signal delay enable value (DSDE) from block 442. An output of AND block 440 is provided as a second input to OR block 424 having an output connected to the control input of a true/false block 444. A second input of true/false block 444 is connected to the output of true/false block 416, and a third input of true/false block 444 receives a zero value from block 446. An output of true/false block 444 defines the valve drive signal output (VDR) of the valve control block 378, output processor block 374 and EGR valve manager block 48. The drive control block 378 converts the signed duty cycle drive control input (DRC) to an absolute value (VDR) and an associated direction command (VD) as shown in FIG. 13.

The EGR valve position control system of the present invention relates to control techniques and strategies useful with EGR valve position control servomechanisms required in air handling systems of internal combustion engines in general, and of diesel engines in particular. The EGR valve is typically driven by a DC motor or other suitable actuator through a linkage mechanism, wherein the motor is typically driven by a circuit, such as an H-bridge circuit, whose PWM duty cycle and direction are continually controlled as described hereinabove based on the valve position command (VPC) and the valve position signal (VP). The disclosed system is able to maintain the EGR valve 38 at a commanded position despite disturbances caused by pressure variations across the EGR valve 38. The EGR valve manager 48 is operable to close the EGR valve 38 quickly by meeting a specified transient response requirement without damaging the valve 38 and/or valve seat. The EGR valve manager 48 is also operable to provide a different transient response during non-valve closing events. Moreover, the disclosed system is operable to compensate for any variations in battery voltage so as to ensure proper operation of the EGR valve 38 despite potentially wide variations in supply voltage.

A central component of the EGR valve control system is a PID control algorithm with reference-prefiltering, integrator anti-windup during saturation of the duty cycle signal, and integrator preset for a smooth recovery of closed-loop control from one or more open-loop control modes. The integral term includes a calibratable dead band so as to avoid limit cycles due to system non-linearities while maintaining acceptable steady state error. Another feature is a deadband on the derivative term so as to remove noisy chattering under steady state conditions. Furthermore, the introduction of a feedforward term in the PID controller provides more timely compensation of dry friction and initial spring load.

Parameter scheduling of the PID controller gains, derivative filter time constants, pre-filter time constants and the feedforward term is used to provide different transient responses during different operating modes of the EGR valve. For example, the gains and filter time constants scheduled for valve closing can be tuned to provide for very rapid response, whereas the gains and filter time constants scheduled for non-valve closing events can be tuned to provide a more over-damped response.

Manipulation of the valve position reference value (VPR) plays an important role in valve protection. During fast valve closing events, a staged reference is used to prevent contact of the EGR valve with its valve seat. The reference is first preferably set to a temporary intermediate position near the valve seat, but sufficiently apart from the seat so as tolerate a reasonable amount of overshoot with enough margin between the valve and seat such that contact therebetween is avoided. Once the EGR valve 38 moves rapidly to this intermediate set point, the valve is then ramped down toward the seat to a closed position. Another manipulate of the valve position reference value (VPR) is the preset of this value to the actual valve position during any open-loop control modes. This, together with integrator preset in the PID controller, provides for smooth recovery to closed-loop control without causing the EGR valve 38 to hit mechanical limits in either direction.

Another important feature of the present invention is the handling of control authorities between normal closed-loop control and various open-loop control modes. A prioritized switching scheme is used to arbitrate control authority among a number of control modes such as, for example, a closed-loop control mode, a valve-seating open-loop control mode, an open-loop user-override mode, a diagnostics override mode and a diagnostics disable mode.

While the invention has been illustrated and described in detail in the foregoing drawings and description, the same is to be considered as illustrative and not restrictive in character, it being understood that only one preferred embodiment thereof has been shown and described and that all changes and modifications that come within the spirit of the invention are desired to be protected.

What is claimed is:

1. System for controlling the op ration of an EGR valve, the system comprising:
   an EGR valve position sensor producing an EGR position signal indicative of a position of said EGR valve relative to a reference position;
   an EGR valve actuator responsive to an actuator control signal to control movement of said EGR valve; and
   a controller producing said actuator control signal, said controller controlling said actuator control signal as a function of said EGR valve position signal to stepwise force said EGR valve toward a closed valve position if an EGR valve command corresponds to a valve close command, said controller controlling said actuator control signal as a function of said EGR valve command to ramp said EGR valve toward said closed position when said EGR position signal indicates that said EGR valve is within a threshold distance from said closed position.

2. The system of claim 1 wherein said controller includes an integrator operable to integrate said EGR valve command and produce a corresponding integrated EGR valve command, said controller controlling said actuator control signal as a function of said integrated EGR valve command to ramp said EGR valve toward said closed position.

3. The system of claim 2 wherein said controller is operable to compare said EGR position signal to an EGR position threshold;
   and wherein said integrator is operable to integrate said EGR valve command between a reference value and a ramp rate value if said EGR position signal is less than said EGR position threshold, said ramp rate value defining a rate at which said EGR valve moves toward said closed position.

4. The system of claim 3 wherein said integrator is operable to produce a zero integrated EGR command if said EGR position is greater than said EGR position threshold.

5. The system of claim 1 wherein said controller is operable to determine that said EGR valve command corresponds to said closed position if said EGR valve command is greater than a command threshold.

6. The system of claim 1 wherein the controller includes a control strategy operable to control the operation of the EGR valve in accordance with a set of controller gains, said controller operable to command a first set of controller gains if said EGR valve command corresponds to said closed command and to otherwise command a second set of controller gains having gain values less than those of said first set of controller gains.

7. The system of claim 1 wherein said controller includes an integrator forming part of a control strategy of s id controller;
   and further including a battery supplying e battery voltage to said controller, said controller disabling said integrator if said battery voltage is greater than an upper threshold or less than a lower threshold.

8. The system of claim 1 wherein said actuator control signal is a pulse width modulated signal;
   and further including a battery supplying a battery voltage to said controller, said controller adjusting a duty cycle of said actuator control signal as a function of an inverse of said battery voltage.

9. The system of claim 7 wherein the controller is operable to determine a gain factor inversely proportional to said battery voltage, said controller adjusting said duty cycle as a function of said gain factor.

10. A method of controlling operation of an EGR valve, comprising the steps of:
    monitoring an EGR valve command provided to control position of an EGR valve;
    stepwise forcing the EGR valve toward a closed position if said EGR valve command corresponds to a valve close command;
    monitoring EGR valve position; and
    ramping the EGR valve to said closed position when said EGR valve position is within a threshold distance from said closed position.

11. The method of claim 10 further including the step of providing a predefined ramp rate;
    and wherein the ramping step includes ramping the EGR valve to said closed position at said predefined ramp rate.

12. The method of claim 11 wherein said predefined ramp rate corresponds to rate of movement of the EGR valve resulting from the ramping step that is slower than a rate of movement of the EGR valve resulting from the stepwise forcing step.

13. The method of claim 11 further including the step of integrating the EGR valve command between a reference value and said predefined ramp rate;
    and wherein the ramping step includes controlling movement of the EGR valve based on the integrated value of the EGR valve command.

14. The method of claim 10 further including the steps of:
    comparing the EGR valve command to a command threshold; and
    determining that said EGR valve command corresponds to said valve close command if said EGR valve command is greater than said command threshold.

15. The method of claim 10 further including the step of comparing the EGR valve position to the threshold distance;
    and wherein the stepwise forcing step includes stepwise forcing the EGR valve toward the closed position as long as the EGR valve position is greater than the threshold distance.

16. The method of claim 10 wherein the operation of the EGR valve is controlled by a controller;
    and further including the steps of:
    commanding a first set of controller gain values for use by the controller if the EGR valve command corresponds to the valve closed command; and
    commanding a second set of controller 9 In values for use by the controller if the EGR valve command does not correspond to the valve closed command, the second set of controller gain values different than the first set of controller gain values.

17. The method of claim 16 wherein the first set of controller gain values are larger than the second set of controller gain values.

18. The method of claim 10 wherein the operation of the EGR valve is controlled by a controller having an integrator forming part of the control strategy of the controller, the controller powered by a battery producing a battery voltage, and further including the step of disabling operation of the integrator if the battery voltage is greater than an upper threshold or less than a lower threshold.

19. The method of claim 10 including a controller operable to produce a pulse width modulated signal for controlling the position of the EGR valve according to the stepwise forcing and ramping steps, the controller powered by a battery producing a battery voltage;
    and further including the step of adjusting a duty cycle of the pulse width modulated signal as a function of an inverse of the battery voltage.

20. The method of claim 19 further including the step of determining a gain factor inversely proportional to the battery voltage;
    and wherein the adjusting step includes adjusting the duty cycle of the pulse width modulated signal as a function of the gain factor.

* * * * *

UNITED STATES PATENT AND TRADEMARK OFFICE
CERTIFICATE OF CORRECTION

PATENT NO. : 6,467,469 B2
DATED : October 22, 2002
INVENTOR(S) : Chang Yang et al.

It is certified that error appears in the above-identified patent and that said Letters Patent is hereby corrected as shown below:

Column 4,
Line 39, please delete "EGR." and replace with -- EGR --.

Column 8,
Line 36, please delete "Of" and replace with -- of --.
Line 61, please delete "(V,PC)" and replace with -- VPC --.

Column 15,
Line 2, please delete "op ration" and replace with -- operation --.
Line 50, please delete "of s id" and replace with -- of said --.
Line 52, please delete "e" and replace with -- a --.

Column 16,
Line 36, please delete "9 In" and replace with -- gain --.

Signed and Sealed this

Fifth Day of August, 2003

JAMES E. ROGAN
*Director of the United States Patent and Trademark Office*